US007221899B2

(12) United States Patent
Ohno et al.

(10) Patent No.: US 7,221,899 B2
(45) Date of Patent: May 22, 2007

(54) CUSTOMER SUPPORT SYSTEM

(75) Inventors: Hiroaki Ohno, Tokyo (JP); Mitsuo Katagiri, Tokyo (JP); Isao Shiromaru, Hiroshima (JP); Noriaki Suginohara, Hiroshima (JP)

(73) Assignees: Mitsubishi Denki Kabushiki Kaisha, Tokyo (JP); Chugoku Electric Power Co., Inc., Hiroshima-Shi, Hiroshima (JP)

( * ) Notice: Subject to any disclaimer, the term of this patent is extended or adjusted under 35 U.S.C. 154(b) by 680 days.

(21) Appl. No.: 10/354,169

(22) Filed: Jan. 30, 2003

(65) Prior Publication Data

US 2004/0152063 A1 Aug. 5, 2004

(51) Int. Cl.
*G09B 3/00* (2006.01)
(52) U.S. Cl. ............... 434/350; 434/107; 434/219; 434/362; 705/8; 706/27
(58) Field of Classification Search ............ 434/107, 434/118, 219, 322, 323, 350, 362, 365; 705/2, 705/7, 8, 30; 379/22, 93.17; 709/205; 715/507; 717/100
See application file for complete search history.

(56) References Cited

U.S. PATENT DOCUMENTS

| | | | | |
|---|---|---|---|---|
| 4,255,619 | A * | 3/1981 | Saito | 379/93.17 |
| 6,196,846 | B1 * | 3/2001 | Berger et al. | 434/118 |
| 6,629,081 | B1 * | 9/2003 | Cornelius et al. | 705/30 |
| 6,636,585 | B2 * | 10/2003 | Salzberg et al. | 379/22 |
| 6,701,345 | B1 * | 3/2004 | Carley et al. | 709/205 |
| 6,754,874 | B1 * | 6/2004 | Richman | 715/507 |
| 2002/0069086 | A1 * | 6/2002 | Fracek, Jr. et al. | 705/2 |
| 2002/0091656 | A1 * | 7/2002 | Linton | 706/27 |
| 2003/0008271 | A1 | 1/2003 | Crook et al. | |
| 2003/0049596 | A1 | 3/2003 | Uda | |
| 2003/0074210 | A1 | 4/2003 | Matsuda et al. | |
| 2003/0110067 | A1 * | 6/2003 | Miller et al. | 705/8 |
| 2003/0139956 | A1 * | 7/2003 | Guenther et al. | 705/7 |
| 2003/0152904 | A1 * | 8/2003 | Doty, Jr. | 434/350 |
| 2003/0211450 | A1 * | 11/2003 | Sofia et al. | 434/350 |
| 2004/0002048 | A1 * | 1/2004 | Thurmaier et al. | 434/350 |
| 2004/0003369 | A1 * | 1/2004 | Gonos | 717/100 |

FOREIGN PATENT DOCUMENTS

| | | |
|---|---|---|
| CN | 383534 | 12/2002 |
| JP | 6-217302 | 8/1994 |
| JP | 2000029861 A * | 1/2000 |
| JP | 2000-348104 | 12/2000 |
| JP | 2002-99612 | 4/2002 |
| JP | 2003058643 A * | 2/2003 |
| KR | 2001-0066177 | 7/2001 |

OTHER PUBLICATIONS

Net-Learning—from Cases of Educations of 21 Century, Kabushiki Gaisha Chuo Keizaisha, Jan. 25, 2001, First Edition, pp. 77-99. (Partial Translation).

(Continued)

*Primary Examiner*—Joe H. Cheng
(74) *Attorney, Agent, or Firm*—Leydig, Voit & Mayer, Ltd.

(57) ABSTRACT

A customer support system for improving the skill of a person engaged in a business with reduced cost for technical training support and enhancing practical training. The customer support system includes a computer system for introducing training contents from a service providing side to a customer side through a computer network; an instructor training facility for training an instructor based on training contents; and a remote technique training support device for the instructor, for supporting technical training on the customer side, from the service providing side, through the computer network.

8 Claims, 15 Drawing Sheets

OTHER PUBLICATIONS

Easily Learned "Net-Edition" Correspondence Lecture, "E-Learning" Becoming Essential, Nikkei PC 21, Nikkei BP Company, Jul. 26, 2001, pp.186-189. (Partial Translation).

Plant Operation Maintenance Services, Toshiba Review, Kabushiki Gaisha Toshiba, Jun. 1, 2001, Vol. 55, No. 6, pp. 49-52. (Partial Translation).

* cited by examiner

CUSTOMER SUPPORT SYSTEM

BACKGROUND OF THE INVENTION

1. Field of the Invention

This invention relates to a customer support system for improving the technique of a person engaged in the business of a general industry and, more particularly, to a customer support system including: a computer system for introducing training contents; an instructor training facility for training the person as an instructor; and a remote technique training support device for the instructor through a computer network.

2. Description of the Related Art

As the training method for improving the technique of a trainee on the customer side, there are: a method receiving the trainee of the customer side at a facility on a service providing side and training the trainee practically; a method for dispatching a specialist to the site of the customer side for the practical training; and a method for training the trainee of the customer side remotely from the service providing side by using a computer network. In the related art, these methods are executed for the training independently of one another.

Here will be described the operations. FIG. 13 is a diagram for explaining the method for receiving a trainee of the customer side at a facility on the service providing side and training the trainee, practically. The customer side dispatches the trainee at 34*a* to a service providing side facility. In the facility on the service providing side, the practical training 34*b* such as a practical machine training, a lecture or a VTR is conducted according to a training schedule 34*d*. After the practical training in the facility on the service providing side, the trainee is returned at 34*c*, and the training is completed.

FIG. 14 is a diagram for explaining the method for dispatching a specialist of the service providing side for the practical training to the facility of the customer side. The service providing side dispatches the specialist at 35*a* for a practical training 35*b* to the facility on the customer side. In case (35*d*) a technical support of another field is needed, each specialist has to be dispatched at 35*e* for a practical training 35*f* at any time. After the training at the practical spot, the specialist is returned at 35*c*, and the training is completed.

Moreover, FIG. 15 is a diagram for explaining the method for the remote training through the computer network. A service providing side facility 14 for the remote training is provided with a facility 14*a* for an online lecture, a training text 14*b*, necessary for the remote training, and information transceiver means 14*c*. In a facility 19 on the customer side through a computer network 17, the online lecture and or the training text is displayed on a CRT 18*c* through a general purpose browser device 18*a* of a general purpose personal computer 18.

The conventional method for receiving the trainee or for dispatching the specialist has an advantage that the operations of a real machine can be understood by experiencing it practically so that the training quality is high. However, the method is troubled by the disadvantage that high expenses are entrained by the moving of the trainee or specialist or that the number of trainees is limited.

On the other hand, the conventional remote training through the computer network has an advantage that the trainee or specialist need not be dispatched to lower the expenses. However, there is a disadvantage that the operations of the real machine cannot be practically experienced to degrade the training quality.

SUMMARY OF THE INVENTION

An object of this invention is to provide a customer support system for reducing the cost for a technical training support and enhancing the training effect.

According to this invention, there is provided a customer support system for improving the technique of a person engaged in business. The customer support system includes: a computer system for allowing a service providing side to introduce the training contents to a customer side through a computer network; an instructor training facility for training a person of the customer side as an instructor on the basis of the training contents; and a remote technique training support device for the instructor, for supporting the technical training of the customer side from the service providing side through the computer network.

Moreover, the customer support system may further comprises a computer system for performing a diagnostic support on the basis of the operation data of a practical machine, as transmitted from the customer side to the service providing side through the computer network, to transmit the support result to the customer side through the computer network.

The foregoing and other objects, features, aspects and advantages of this invention will become more apparent from the following detailed description of the invention when taken in conjunction with the accompanying drawings.

DESCRIPTION OF THE PREFERRED EMBODIMENTS

Figure 1:
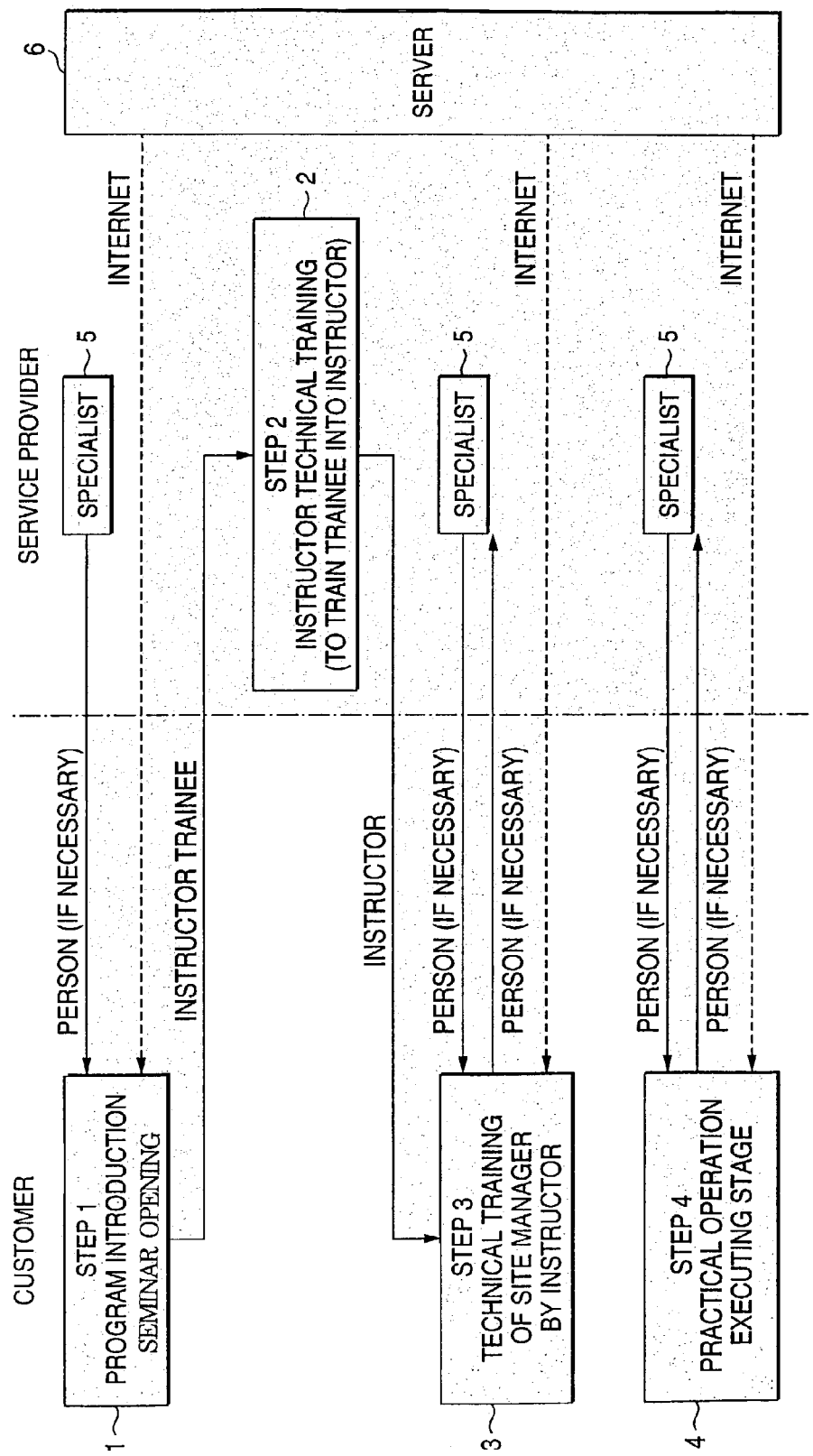
FIG. 1 is a diagram for explaining the flow of a technical training support service in a customer support system of Embodiment 1 of this invention.

Embodiment 1:

Embodiment 1 of this invention will be described with reference to the accompanying drawings. FIG. 1 is a diagram for explaining the flow of a technical training support service in a customer support system of Embodiment 1 of this invention. Numeral 1 designates a program introduction/seminar opening; numeral 2 an instructor technical training; numeral 3a technical training of a site manager (or a spot manager) by an instructor; numeral 4 an operation executing stage; numeral 5 a specialist; and numeral 6 a server.

Figure 2:
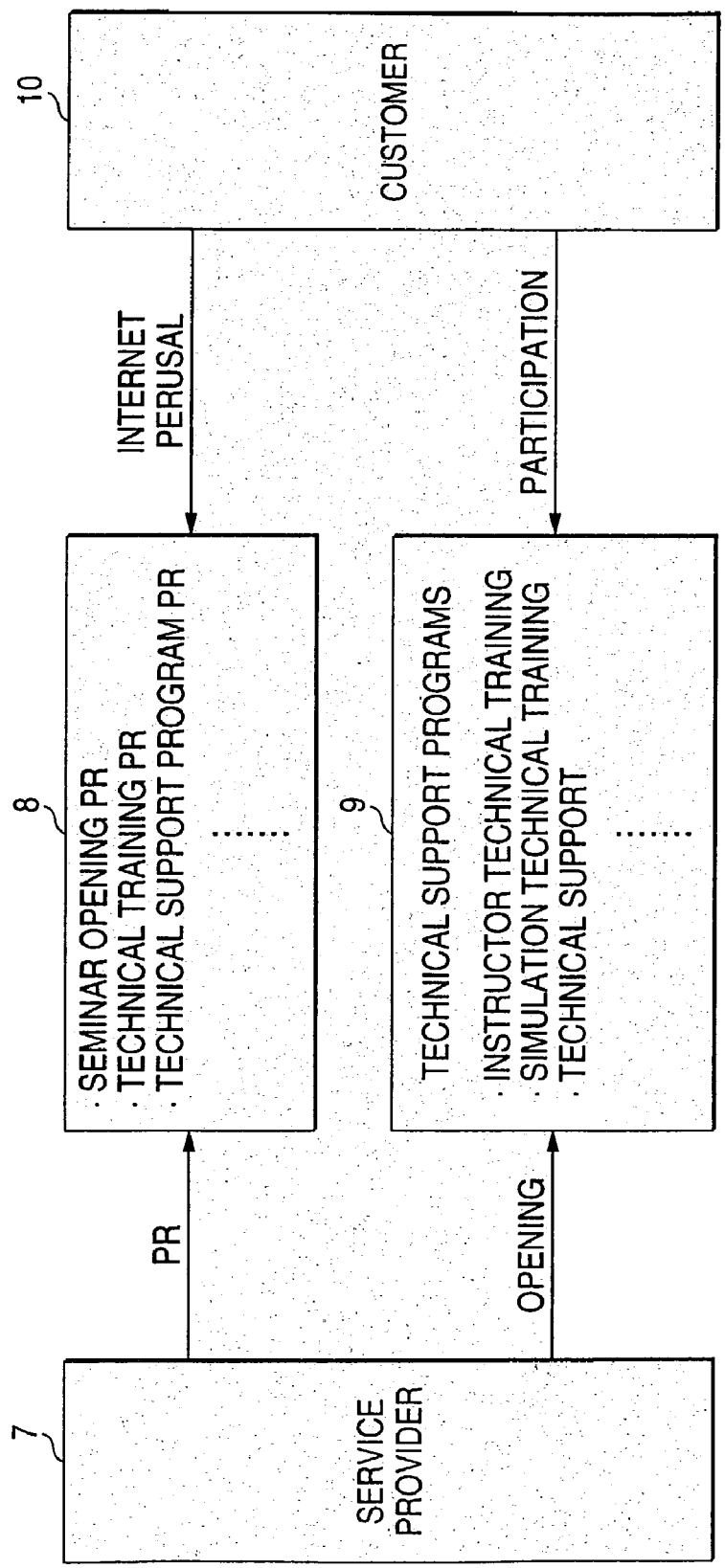
FIG. 2 is a diagram for explaining the flow of a program introducing/seminar opening of Embodiment 1.
Figure 3:
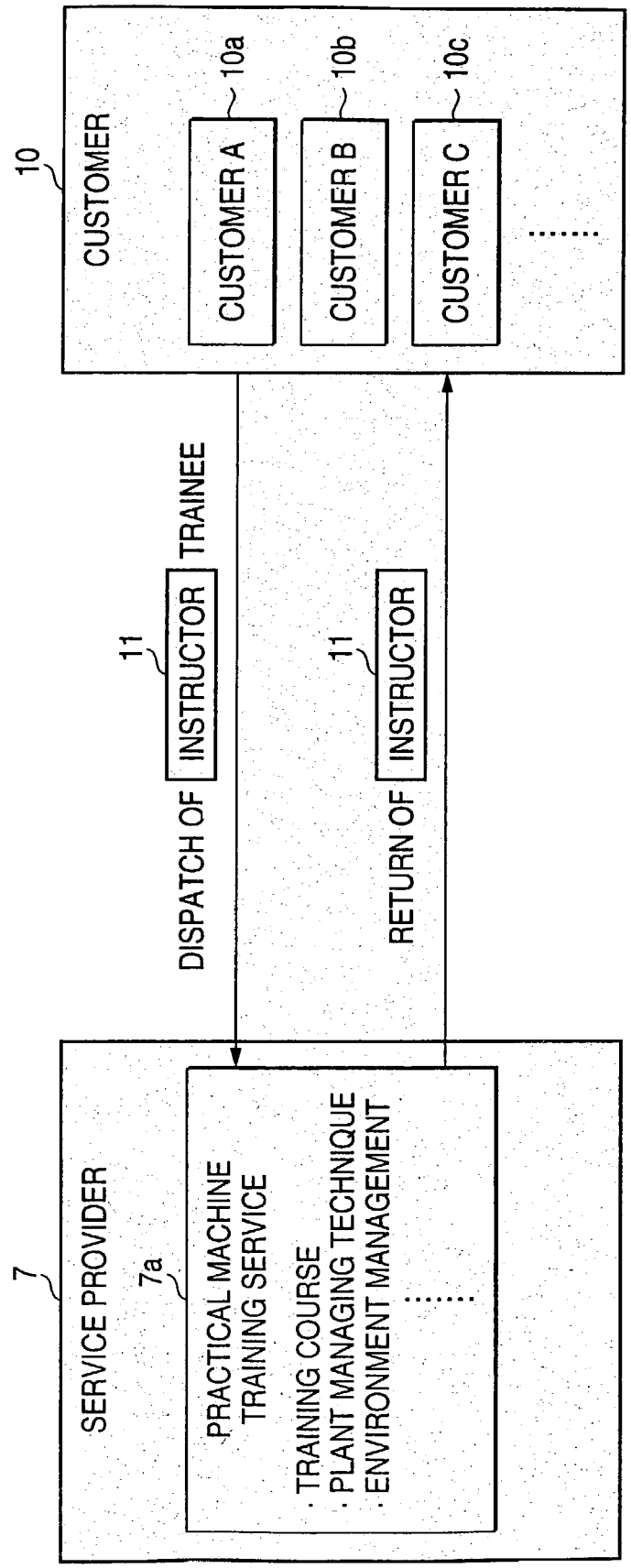
FIG. 3 is a diagram for explaining the flow of an instructor training support of Embodiment 1.
Figure 4:
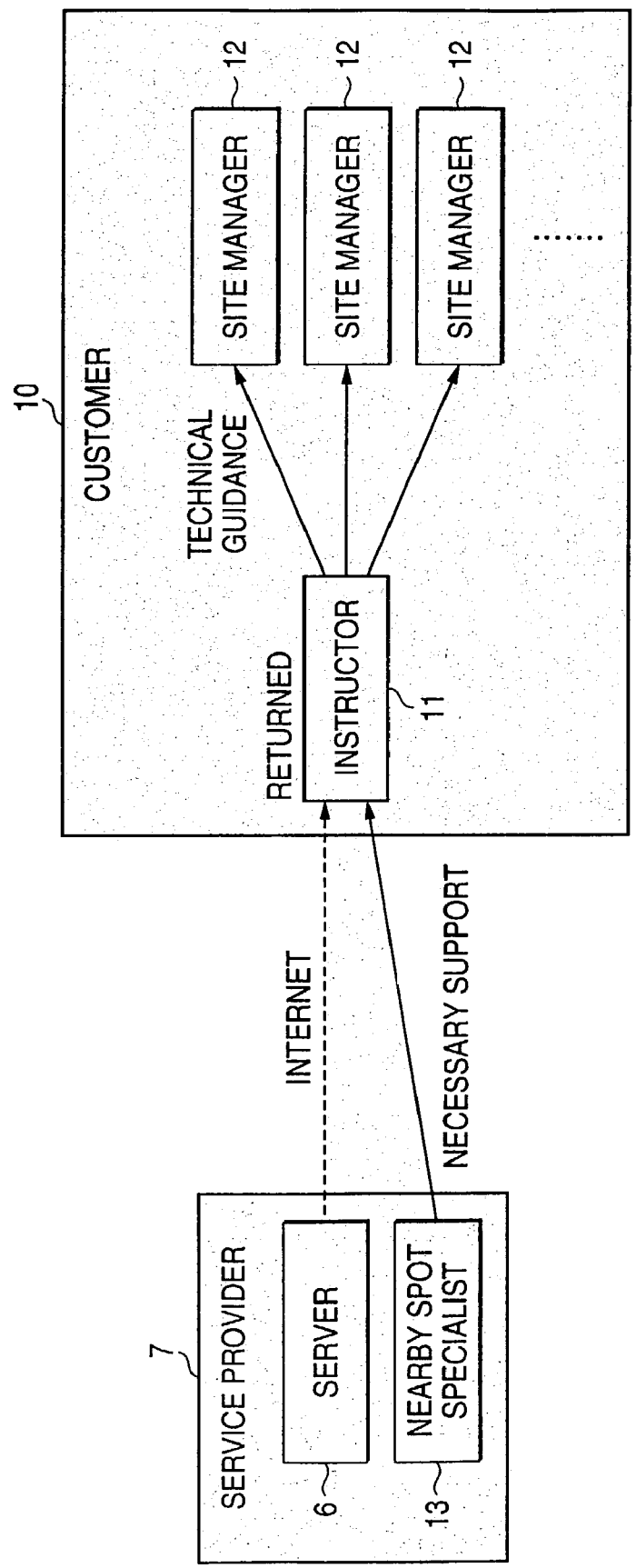
FIG. 4 is a diagram for explaining the flow of a technique training of a site manager by an instructor of Embodiment 1.
Figure 5:
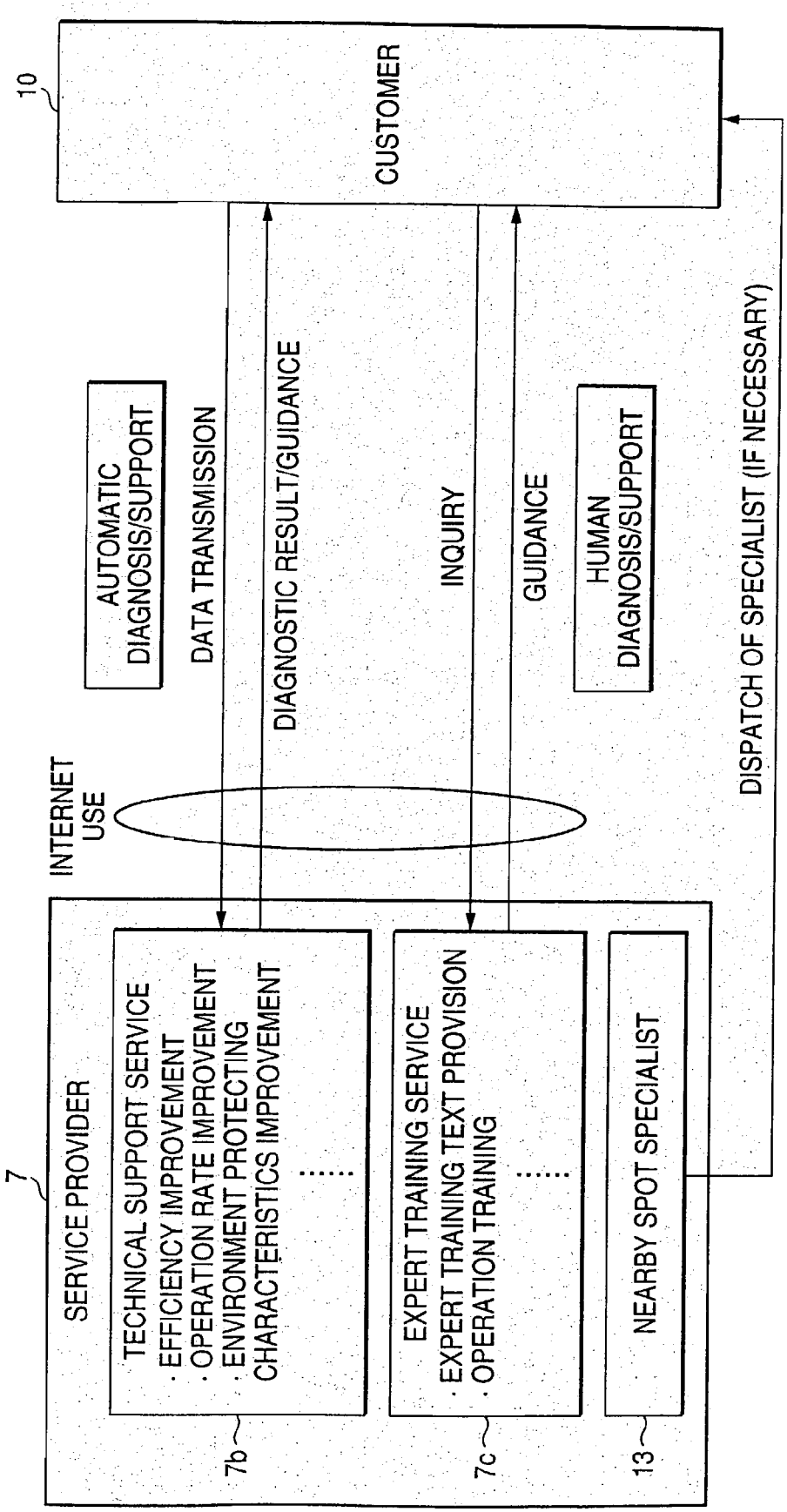
FIG. 5 is a diagram for explaining the flow of a practical execution stage of Embodiment 1.

FIG. 2 is a diagram for explaining the flow of a program introducing/seminar opening. FIG. 3 is a diagram for explaining the flow of an instructor training support. FIG. 4 is a diagram for explaining the flow of a technique training of a site manager by an instructor. FIG. 5 is diagram for explaining the flow of a practical execution stage. In these Figures: numeral 7 designates a service provider; numeral 7a a practical machine training service provided by the service provider such as a training course, a plant managing technique or an environment management; numeral 7b a technical support service provided by the service provider such as an efficiency improvement, an operation rate improvement or an environment protecting characteristics improvement; numeral 7c an expert training service provided by the service provider such as an expert training text provision or an operation training; numeral 8 a Web (a portal site); numeral 9 a seminar; numeral 10 a customer; and 10a, 10b and 10c a customer A, a customer B and a customer C such as specific companies, respectively. Numeral 11 designates an instructor; numeral 12 a site manager; and numeral 13 a nearby spot specialist.

Figure 6:
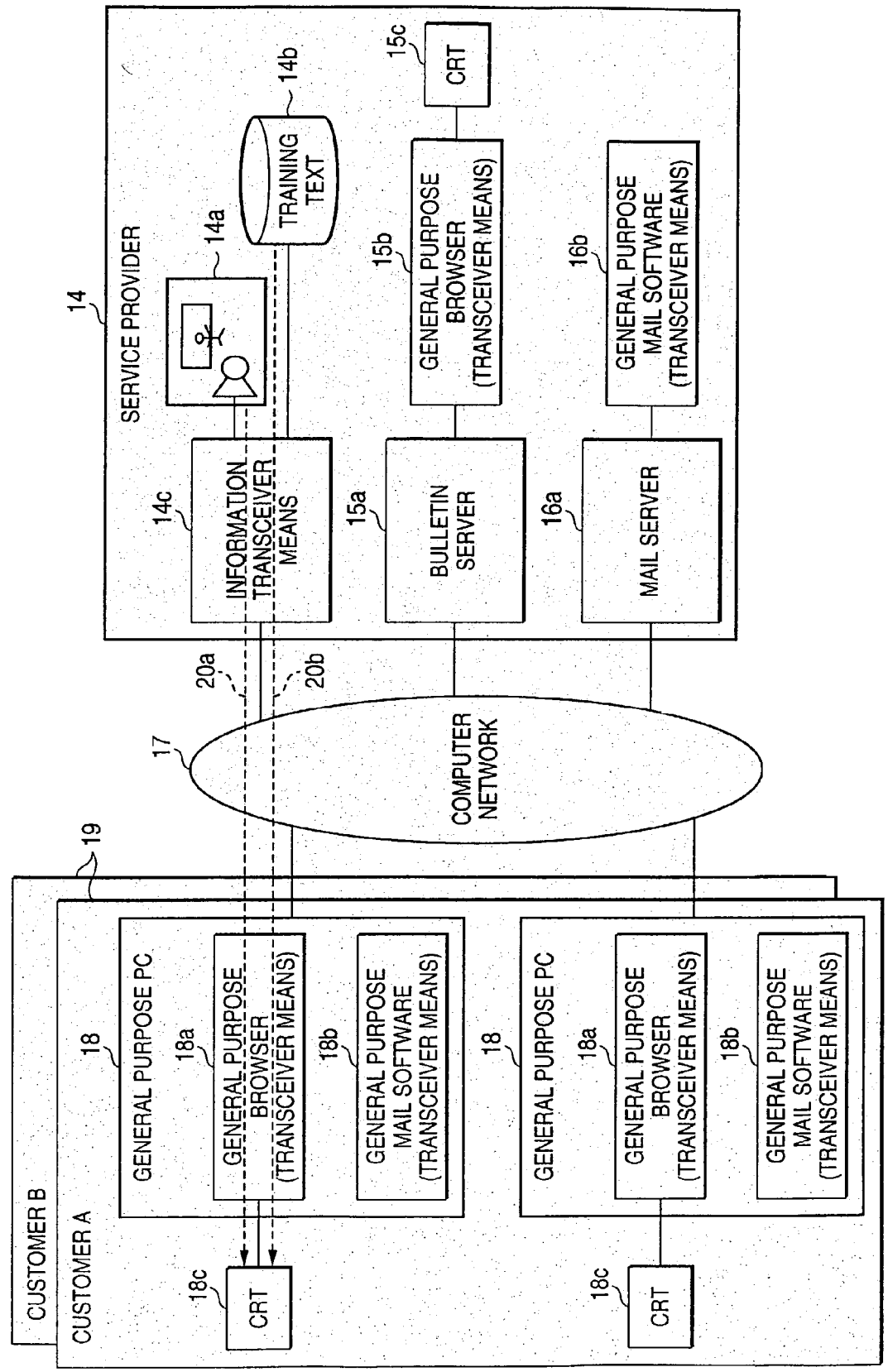
FIG. 6 is a diagram showing a remote training system in the customer support system of Embodiment 1 of this invention.

FIG. 6 is a diagram showing a remote training system in the customer support system of Embodiment 1 of this invention. In FIG. 6, numeral 14 designates a service provider side facility for the remote training. Numeral 14a designates a facility for an online lecture; numeral 14b a training text necessary for the remote training; and numeral 14c information transceiver means. Numeral 15a designates a server for an electronic bulletin board, which is provided with a plurality of bulletins according to training items; numeral 15b a general purpose browser, which is provided with transceiver means for writing/referring to the electronic bulletin board on the service provision side; and numeral 15c a CRT for displaying the information received. Numeral 16a designates an electronic mail server for managing electronic mails, and numeral 16b designates a general purpose mail software, which is provided with transceiver means by which the service provision side use the electronic mails received.

Numeral 17 designates a computer network, and numeral 18 designates a plurality of general purpose personal computers on the customer side. Numeral 18a designates a general purpose browser device having transceiver functions for the remote training; numeral 18b a general purpose mail software having the transceiver functions of electronic mails; and numeral 18c a CRT for displaying those pieces of information. Numeral 19 designates a plurality of customers. Numeral 20a designates the flow of the data of the online lecture service, and numeral 20b designates the flow of the data of the training service with the training text.

The operations will be described with reference to FIG. 1, FIG. 2, FIG. 3, FIG. 4 and FIG. 5. Referring to FIG. 2, in the program introduction 1 or the introduction of training contents, at Step 1, the service provider 7 executes the seminar opening PR, the technical training PR or the technical support program PR on the items of the training date and hour, the technical training or the technical support on the Web (or the portal site) 8. The customer 10 can peruse those contents through the computer network such as the internet and can apply to them. In the seminar opening 1, the service provider 7 opens the seminar 9 and introduces the detailed contents of the technical support program, such as the instructor technical training, the simulation technical training or other various technical support contents to the customer 10 participating in the seminar 9.

Next as seen in FIG. 3, as Step 2 in the instructor technical training 2, the instructor trainee of the customer 10 is dispatched to the practical machine facility (or the practical training facility), as owned and managed by the service provider 7, and the service provider 7 executes the practical machine training 7a and others to the instructor trainee of the customer 10. The training is executed concentratedly on the items which are difficult to understand unless practically experienced through touching the practical machines, such as the training lecture of the practical machine operations, the plant managing technique or the environment management. At the end of this practical machine training, the instructor trainee of the customer 10 is returned as the instructor having learned the technique, from the practical machine facility where the training was executed.

Next as Step 3 in the technical training 3 of the site manager by the instructor as shown in FIG. 4, the instructor 11 who has been trained on the practical machine training 7a at Step 2 and returned, executes the technical guidance on the site staff 12 of the customer 10. In the technical guidance, when the newly trained instructor confronts with the cases which requires to reconfirm the contents of the practical machine training or the cases to be newly continued the instructor 11 executes the supplement of the practical machine training and the guidance directly to the site staff 12 by using the remote technique training support device for the instructor, as provided by the service provider 7, from the server 6 through the computer network such as the internet. At this time, the support is also offered, if necessary, by the nearby spot specialist 13 to the customer 10.

Next in the operation executing stage of Step 4, as shown in FIG. 5, the practical operations such as the operations of a facility are executed at the customer 10 site by the site staff who has received the technical training. At this time, the practical technical support is executed in the following procedure. Specifically, the operation data of the practical machine facility of the customer 10 are automatically transmitted to the service provider 7 through the computer network such as the internet. The service provider 7 executes various diagnoses based on those data, such as the diagnoses of the efficiency or operation rate of the facility or the diagnostic support of the environment protecting characteristics, and presents the results and the guidances to the customer 10 through the computer network such as the internet.

Moreover, the customer 10 asks the technically unknown points having occurred during the technical training, by means of the electronic bulletin board or mail through the computer network. The service provider 7 provides the expert training text or operation training service proper for the contents of that inquiry, either through the electronic bulletin board or mail through the computer network, or in the form of an online lecture, and offers diagnoses and supports. Moreover, the service provider 7 makes the technical support, if necessary, by dispatching the nearby spot expert 13 to the customer 10.

How to realize the remote training will be described with reference to FIG. 6. The service provider 14 is provided with the facility 14a for the online lecture. In the facility 14a for the online lecture, the training is suitably made by the lecturer, and the online lecture data 20a having photographed those contents are fed through the information transceiver means 14c and the computer network 17 to the general purpose personal computer 18 or the customer side facility, which mounts the general purpose browser 18a having the transceiver means, and are displayed on the CRT 18c. As a result, the lecture data 20a on the online can be referred to from the customer side so that the trainee can receive the lecture being remotely executed, online. By using this remote training, a plurality of customers 19 can be trained so that more trainees can be trained.

Next, the training using the training text will be described on the remote training through the computer network. The training text 14b necessary for the remote training is fed through the information transceiver means 14c and the computer network 17 to the general purpose personal computer 18 or the customer side facility which mounts the general purpose browser 18a having the receiving means, and the training data 20b are displayed on the CRT 18c. As a result, the training data 20b can be referred to from the customer side so that the trainee can receive the training using the training text which is remotely disposed. This training has no restriction especially in the time so that it can be freely done when it is convenient to the trainee.

As the means for the trainee to solve the questionable points in the lecture contents or the like, there are a method using the electronic bulletin board and a method using an electronic mail, as will be described in the following. The service provider 14 is provided with the electronic bulletin board server 15a. When the trainee has a question to ask, the trainee can use the general purpose browser 18a to make an access to the electronic bulletin-board for the training, and writes the question therein. The service provider 14 uses the general purpose browser 15b and answers the question in the bulletin board. The information written in the electronic bulletin board can be perused from all the places receiving the common training. By writing a further question or answer from the trainee of another customer, therefore, mutual learning can be made to raise the levels of the trainees.

Here will be described on the electronic mail. In case the trainee wants to ask the lecturer directly, he or she uses the general purpose mail software 18b installed on the general purpose personal computer 18 and prepares a question to the lecturer. The prepared question is transmitted through the computer network 17 to the lecturer 16b via the mail server 16a which is disposed in the facility on the service providing side. In response to the question, the lecturer prepares an answer, which is sent through the computer network to the general purpose personal computer 18 of the trainee on the customer side. The trainee is able to acquire the answer to the question instantly by using the remote training system.

As has been described hereinbefore, Embodiment 1 provides a customer support system comprising: a computer system for introducing training contents from a service providing side to a customer side through a computer network; an instructor training facility for training a person as an instructor on the basis of the training contents; and a remote technique training support device for the instructor for supporting the technical training of the customer side from the service providing side through the computer network. Another is a customer support system further comprising for transmitting/receiving an inquiry transmitted from the customer side to the service providing side and a support therefor by an electronic bulletin board or mail through the computer network. Still another is a customer support system further comprising a computer system for performing a diagnostic support on the basis of the operation data of a practical machine, as transmitted from the customer side to the service providing side through the computer network, to transmit the support result to the customer side through the computer network.

Thus, Embodiment 1 provides a customer support system comprising the instructor training facility (e.g., the practical machine facility) for educating the instructor and the remote technique training support device for the instructor. Therefore, Embodiment 1 makes it possible to receive the technical support of a specialist of the service provider remotely and offers merits that the cost and time for moving the man powers can be reduced especially at remote places and overseas and that technical training supports of higher qualities can be made. Moreover, the remote technique training support device eliminate the need of moving the man power, and can be applied to a plurality of customers so that a large number of customers can be simultaneously trained to augment those merits drastically.

On the other hand, it becomes possible for the customer to obtain technical supplement and continuous technical supports at any time by computer. As compared with the conventional training resorting to the dispatch of trainees, therefore, the customer can receive more effective training and technical supports and can confirm the effect of the technical training supports. Thus, the customer support system is an effective system in reducing the cost for the technical training support and in increasing the effect.

The customer support system of this invention is effective for the technical training or technical support, for plant operations, for example, of electric power enterprises, and can also support agricultural/fisheries or medical enterprises technically with a similar flow. According to the technical support at the remote site, the customer support system can have similar effects to reduce the cost for moving the manpower and to make the technical support continuously.

Figure 7:
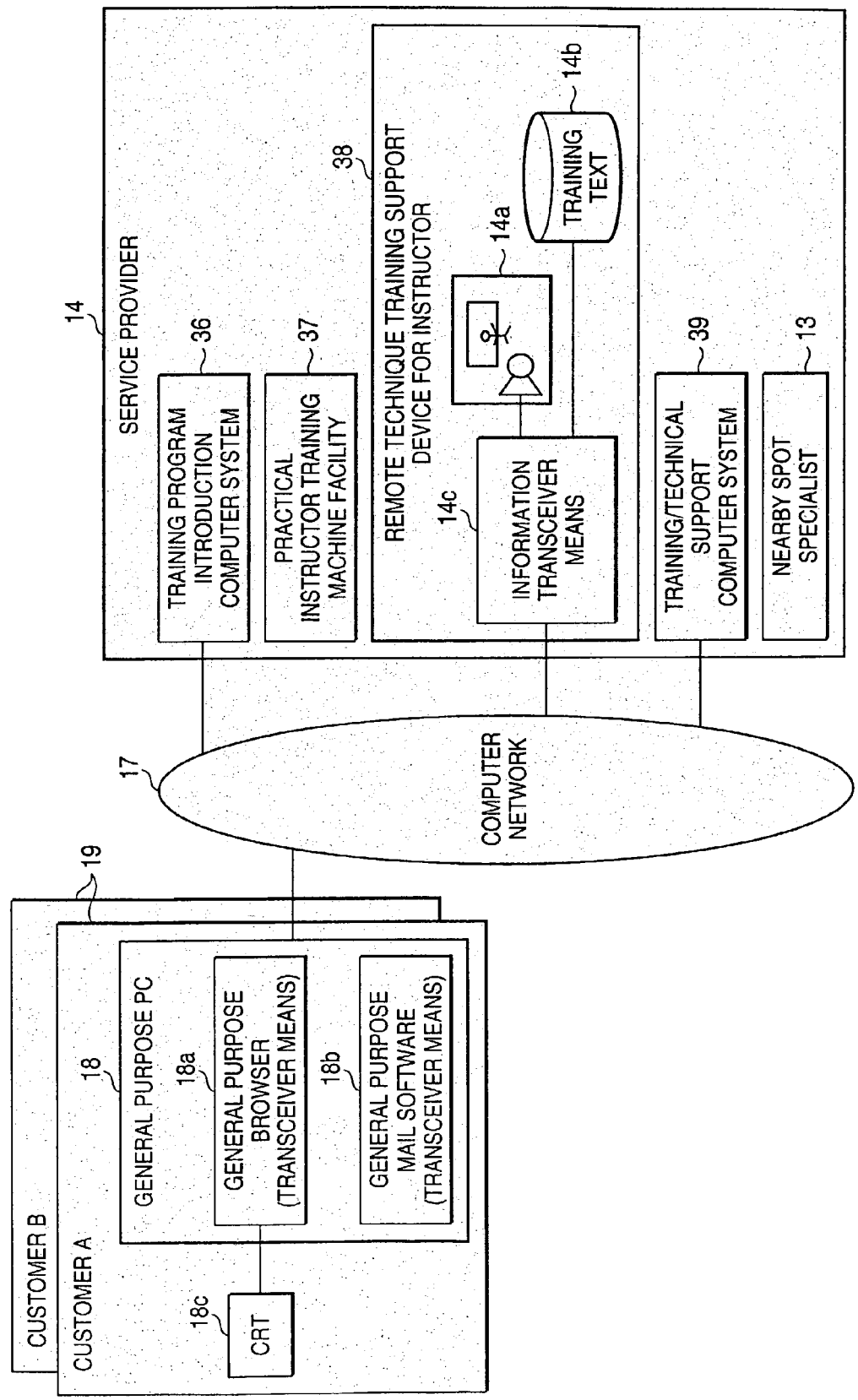
FIG. 7 is a diagram showing a customer support system of Embodiment 2 of this invention.

Embodiment 2:

FIG. 7 is a diagram showing a customer support system of Embodiment 2 of this invention. In FIG. 7, reference numeral 36 designates a computer system for introducing training programs or training contents; numeral 37 a practical instructor training machine facility for training a trainee into an instructor; numeral 38 a remote technique training support device for an instructor, for supporting the technical training to be done on a site staff by the returned trainee as the instructor; and numeral 39 a computer system for confirming the effect of the technical training/support through the computer network after the practical operations.

Here will be described the operations. In FIG. 7, at Step 1, the service provider 14 displays the training programs, as stored in the computer system 36, on the CRT 18c of the general purpose personal computer 18 through the computer network 17, and invites trainees. At Step 2, the trainee of the customer 19 is dispatched to the practical instructor training facility 37 owned by the service provider side, and is trained, while experiencing the practical machine actually, as the instructor on the practical operation and mechanism of the practical machine on the basis of the training contents. After this training, the trainee is returned. At Step 3, the returned trainee executes the technical guidance as an instructor on the site staff. In case that, during the technical guidance, the new instructor was to reconfirm the contents of the practical machine training of Step 2 or confronts any item to be newly confirmed, necessary information such as the training contents or the technical items are so obtained by the remote technique training support device for the instructor, that the training text provided by the service provider is received by the information transceiver means 14c on the general purpose browser 18a of the customer through the computer network 17 and displayed on the CRT 18c.

At Step 4 or the stage in which the practical operations of the facility are done, the operation data of the practical machine facility of the customer 19 are automatically transmitted to the service provider 14 through the computer network 17. By the computer system 39, the service provider 14 performs various diagnoses such as the diagnosis of the efficiency or operation rate of the facility or the diagnostic support of the environment protecting characteristics, and presents the result or guidance to the customer 19 through the computer network 17. Moreover, the technically questionable points having occurred in the customer 19 are inquired by the customer 19 via the electronic bulletin board or mail through the computer network. In response to these inquired contents, the service provider 14 provides the proper expert training text or operating training services either in the bulletin or mail or in the form of an online lecture through the computer network thereby to diagnose/support the customer 19. Moreover, the technical support is done, if necessary, by dispatching a nearby spot expert 13.

Here in FIG. 7, the practical instructor training machine facility 37 is provided with the service providing side to receive and train the trainees of the customer side practically. However, the practical training of the trainee of the customer may be done on the customer side by providing the practical instructor training machine facility with the customer side and dispatch the specialist of the service providing side to the customer side. Still moreover, the practical instructor training machine facility may use the training text together.

As has been described hereinbefore, the customer support system of Embodiment 2 thus far described can also achieve actions and effects similar to those of Embodiment 1.

Figure 8:
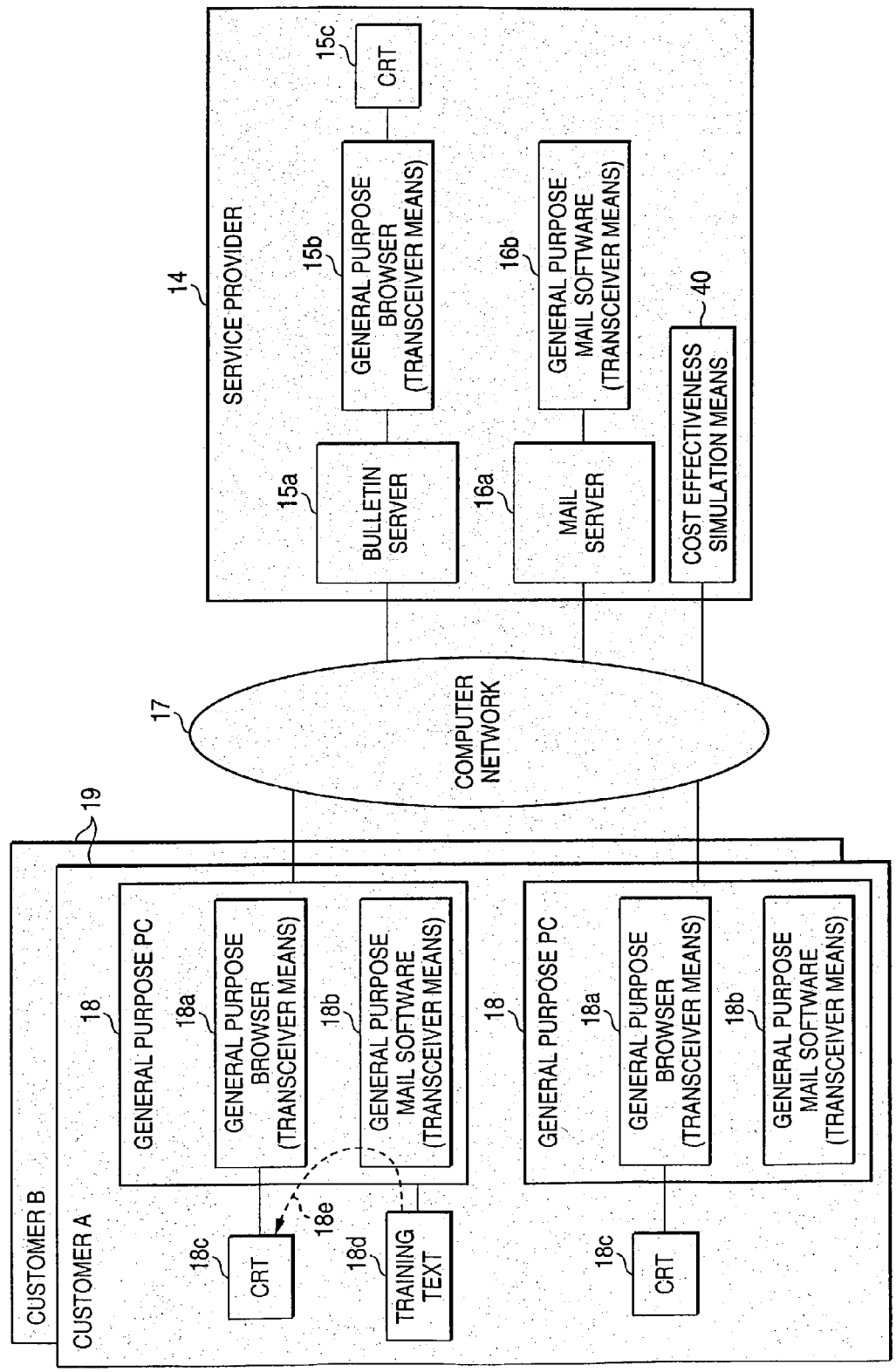
FIG. 8 is a diagram showing a remote training system in a customer support system of Embodiment 3 of this invention.

Embodiment 3:

FIG. 8 is a diagram showing a remote training system in a customer support system of Embodiment 3 of this invention. In FIG. 8, numeral 18d designates a training text, and numeral 18e designates the flow of training text data. Numeral 40 designates cost effectiveness simulation means for the technical training/training support.

Here will be described the operations. The training flow is similar to that of Embodiment 1 so that the description hereof will be omitted, and the remote training will be described. The training text 18d is a medium such as CD-ROM and is sent beforehand to the customer. Before receiving the training, the trainee sets the training text 18d in the general purpose personal computer 18 so that the training data 18e are displayed on the CRT 18c. As a result, the trainee can receive the lecture of the training remotely.

In the contract of the training lecture, moreover, an inquiry or questionnaire is executed on the trainee through the electronic bulletin board or electronic mail, which has been described in connection with Embodiment 1. For the introduction of the training contents, the inquiry or questionnaire is directed to what kind of training the trainee wants to select or receive, or what kind of data, for example, motion picture, photograph or text the trainee wants to select or use as the training text. The result of this inquiry or questionnaire is evaluated by the cost effectiveness simulation means 40 so that the training cost for the training item or text the customer desires is calculated and is presented to the customer by the electronic bulletin board and the electronic mail, as have been described in connection with Embodiment 1. The customer confirms the presented contents of that cost and contracts on the training lecture if the cost effectiveness satisfies the customer.

In this Embodiment 3, the training text can be directly referred to so that the access speed can be made higher than that of the remote training through the computer network. Upon the contract, moreover, the operations of the training/technical support can be optimized by the simulation of the cost effectiveness.

Figure 9:
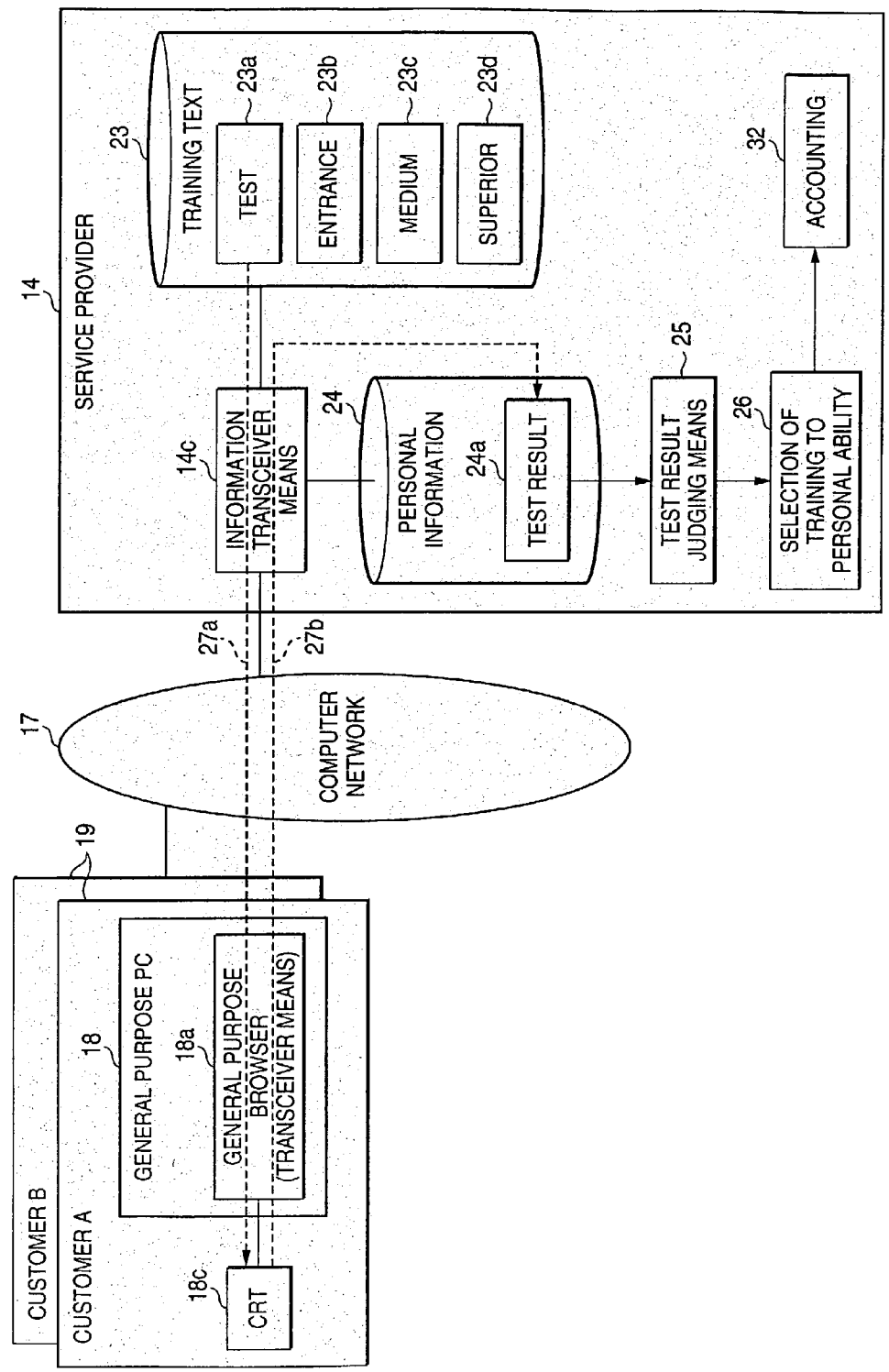
FIG. 9 is a diagram showing a remote training system in a customer support system of Embodiment 4 of this invention.

Embodiment 4:

FIG. 9 is a diagram showing a remote training system in a customer support system of Embodiment 4 of this invention. In FIG. 9: numeral 23 designates a training text necessary for the remote training; numeral 23a test data; and numerals 23b, 23c and 23d training texts, which are prepared according to the level of the trainee, entrance, medium and superior. Numeral 24 designates the personal information of the trainee, and numeral 24a designates the stored test results of each trainee. Numeral 25 designates test result judging means, and numeral 26 designates a training selection according to the personal ability of the trainee. Numeral 27a designates the flow of test data, and numeral 27b designates the flow of the test result data. Numeral 32 designates the billing.

Here will be described the operations. The training flow is similar to that of Embodiment 1 so that the description thereof will be omitted, and the remote training system will be described. As the means for selecting the training text for the remote training, the trainee takes at first a test for the ability judgment. The test data 27a are sent from the training text database 23 or the facility of the service provider to the general purpose personal computer 18 on the customer side through the information transceiver means 14c and the computer network 17, and are displayed on a CRT device 18C. The trainee takes the test, the data of which are stored as the learning history/test result 24a in the personal information database 24 on the service provider side through the general purpose personal computer 18 and the computer network 17. The training text 23 is prepared in plurality according to the levels of the trainees, such as the entrance and medium levels. In the test result judging means 25, the level of the trainee is classified into the entrance, medium or the like according to the test result 24a, and the training is selected at 26 according to the personal ability. Moreover, the billing 32 is made according to this selection result of the training.

Figure 10:
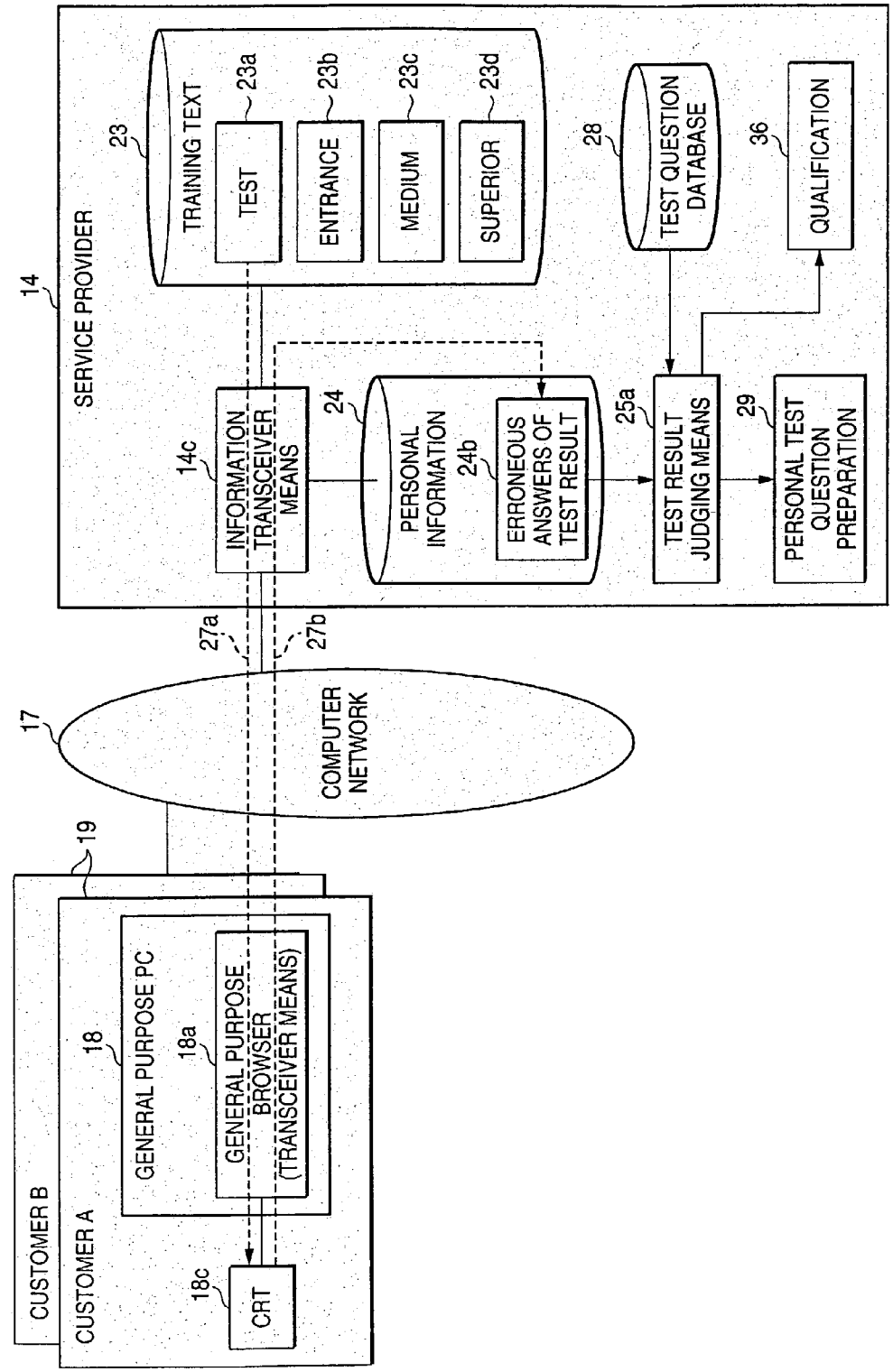
FIG. 10 is a diagram showing a remote training system in a customer support system of Embodiment 5 of this invention.

Embodiment 5:

FIG. 10 is a diagram showing a remote training system in a customer support system of Embodiment 5 of this invention. In FIG. 10, the numeral 24 designates the personal information of the trainee, and numeral 24b designates a storage of erroneous answers of the test result of the trainee.

Numeral 25*a* designates test result judging means; numeral 28 a training test question database; and numeral 29 personal test questions. Numeral 36 designates a qualification.

Here will be described the operations. The training flow is similar to that of Embodiment 1 so that the description thereof will be omitted, and the remote training will be described. A test is made as a method for judging the ability of the trainee, and the erroneous answers of the test result are stored at 24*b* in the personal information 24. Test questions according to numerous patterns are prepared in the training test question database 28. The erroneous answer data 24*b* and the training test question pattern 28 judge the personal weak field by the test result judging means 25*a* and prepare the personal test questions forcusing the contents similar to those of the mistaken questions. On the basis of the judgment result of the test result judging means 25*a*, the trainee is qualified at 36 and given a predetermined qualification. As a result, the technical level of the trainee is ranked.

Figure 11:
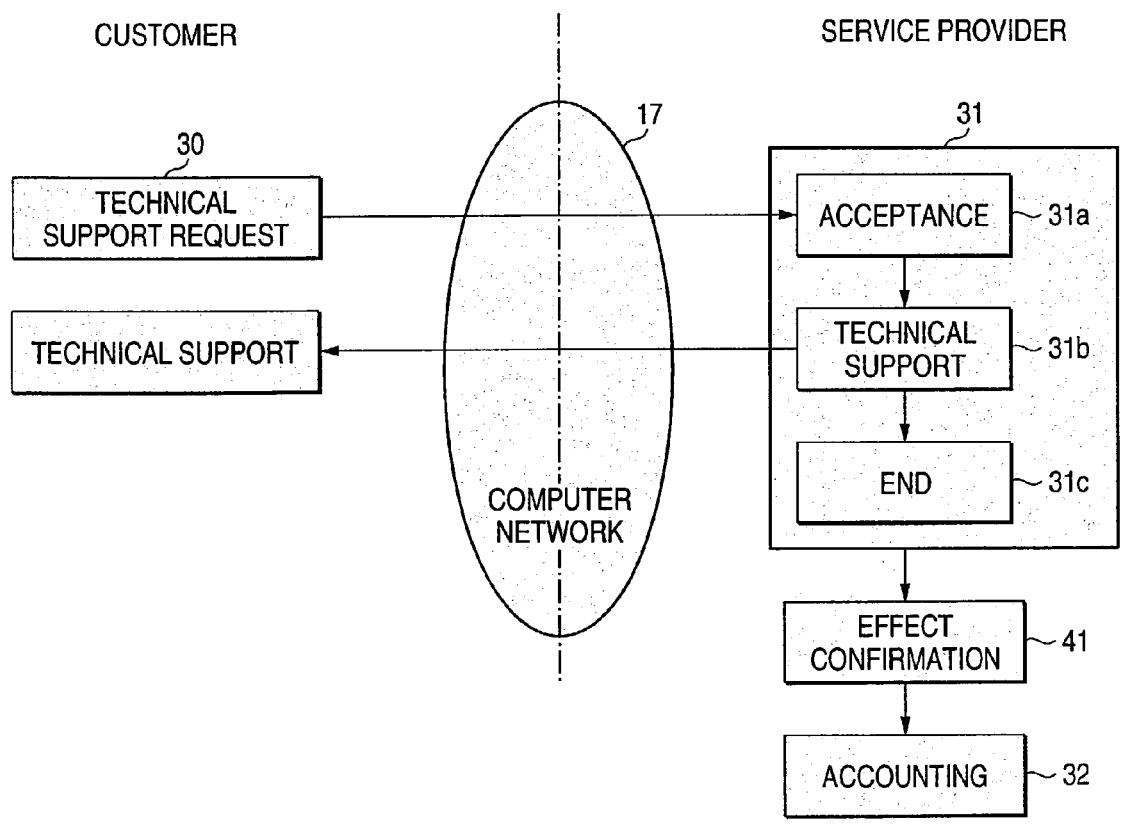
FIG. 11 is a diagram showing the technical supporting and accounting functions in a customer support system of Embodiment 6 of this invention.

Embodiment 6:

FIG. 11 is a diagram showing the technical supporting and billing functions in a customer support system of Embodiment 6 of this invention. In FIG. 11, numeral 30 designates a technical support request from the customer side; numeral 31 the flow of a technical support on the service providing side; numeral 31*a* an acceptance of the technical support request; numeral 31*b* a technical support; and numeral 31*c* the end of the technical support. Numeral 41 designates the confirmation of an effect, and numeral 32 designates the billing of the technical support.

Here will be described the operations. The customer side makes the technical support request 30 when it needs the technical support of the service providing side. The technical support is made through the computer network 17. In response to the technical support request 30 from the customer side, the service providing side makes the acceptance 31*a* of the technical support and provides the technical support 31*b* to the customer side. After the end of the technical support, the effect of the technical support is confirmed at 41, and the fare is billed at 32 according to the extent of the effect. As compared with the conventional billing method by a term contract, the billing is made for each technical support so that the expense for only the actually supported contents is paid. It is, therefore, possible to expect the effect that the expenses on the customer side can be reduced. Moreover, as the customer expenses for each technical support, the customer becomes conscious of the cost, which may result to improve the training efficiency because the trainee tries to deepen the understanding of the training while the training is being provided.

Figure 12:
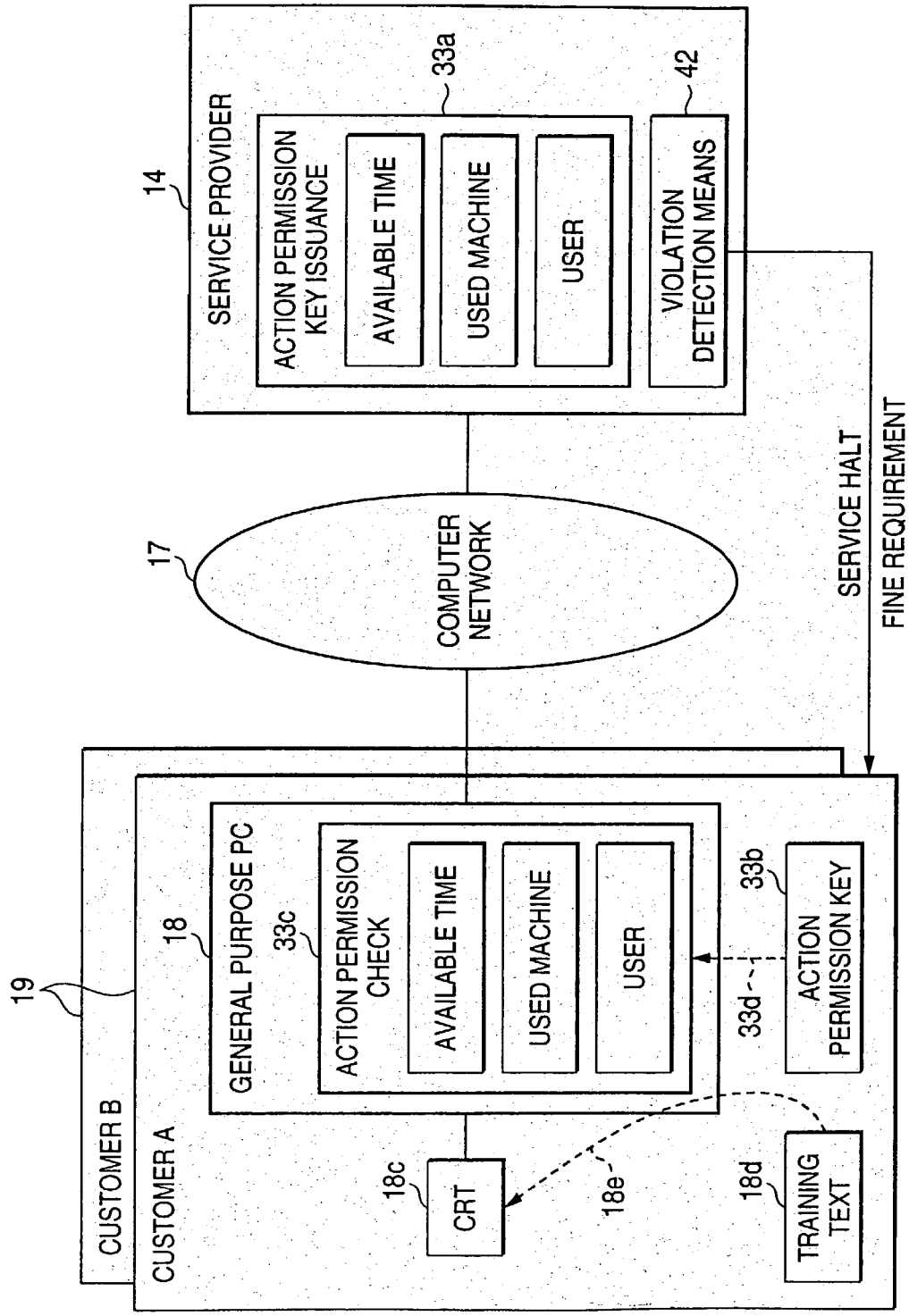
FIG. 12 is a diagram showing an action permitting function by an action permission key in a customer support system of Embodiment 7 of this invention.
Figure 13:
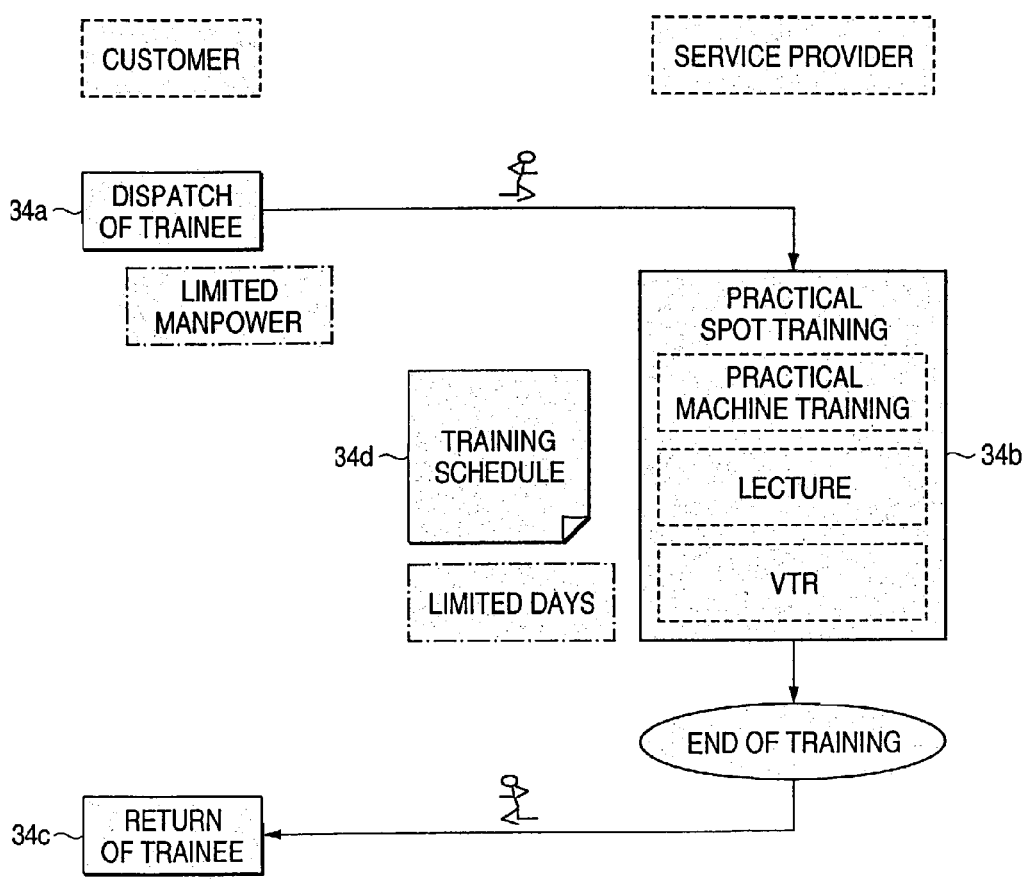
FIG. 13 is a diagram for explaining the conventional method for conducting a practical training on the service providing side.
Figure 14:
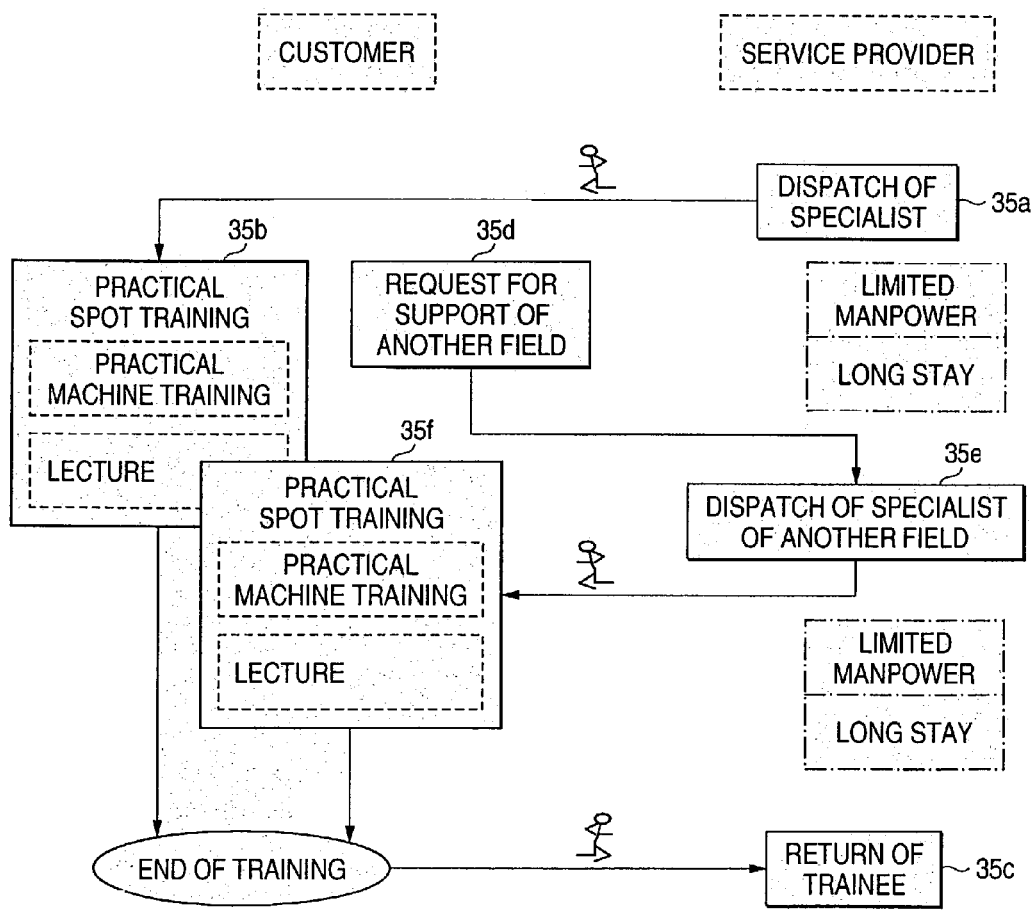
FIG. 14 is a diagram for explaining the conventional method for conducting a practical training on the customer side.
Figure 15:
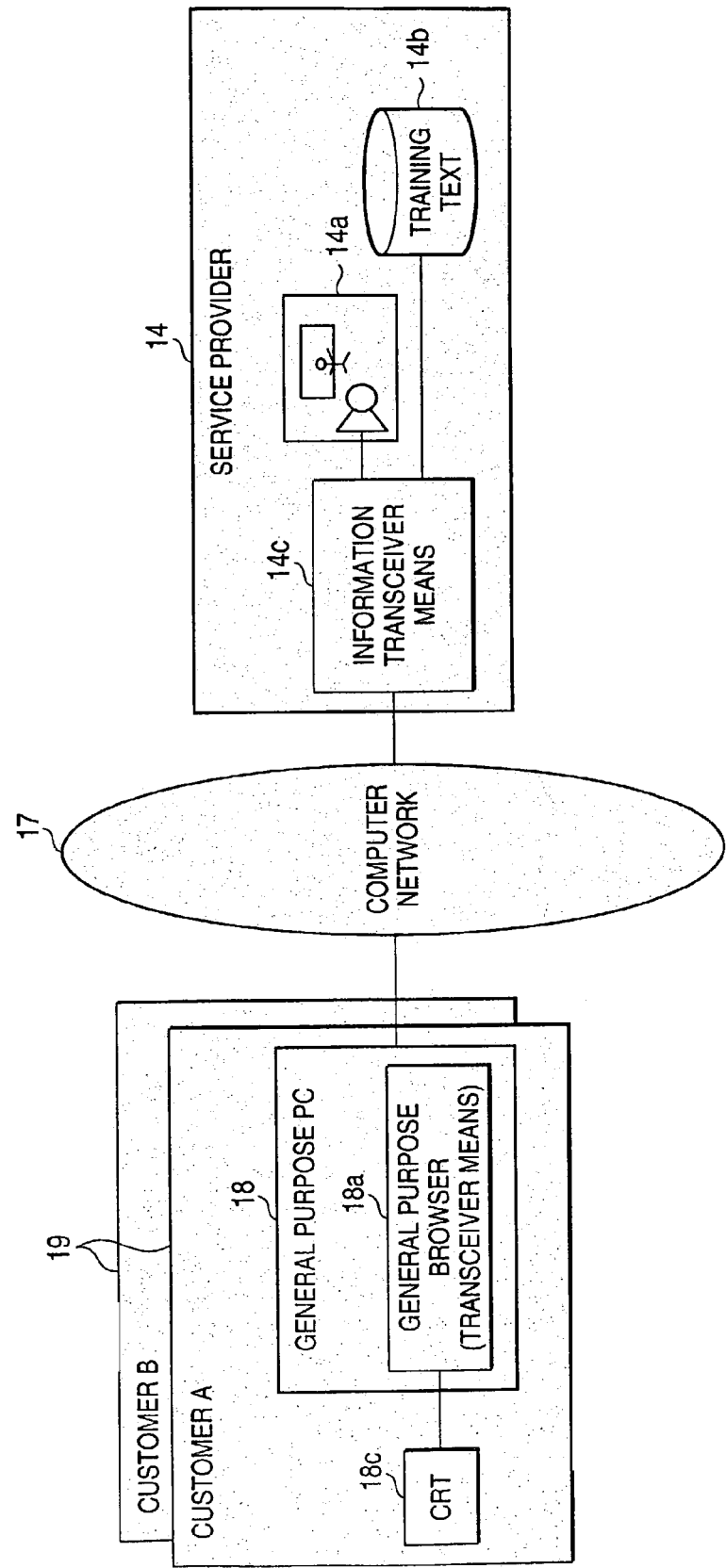
FIG. 15 is a diagram for explaining the conventional method for conducting a remote training through a computer network.

Embodiment 7:

FIG. 12 is a diagram showing an action permitting function by an action permission key in a customer support system of Embodiment 7 of this invention. In FIG. 12, numeral 33*a* designates action permission key issuing means of the training text; numeral 33*b* an action permission key of the training text; numeral 33*c* action permission check means of the training text; and numeral 33*d* the flow of the action permission key. Numeral 42 designates violation detecting means.

Here will be described the operations. The training flow is similar to that of Embodiment 1 so that the description thereof will be omitted. What will be described is the action permission function of the training text by the action permission key which is an additional function added to the remote technique training support device for the instructor.

The training text 18*d* is sent beforehand as the media such as DC-ROM to the customer side. On the service providing side, the action permission key 33*b*, which is conditioned for the permission such as the training term, the information intrinsic to the personal computer on the customer side or the information of the user, is issued by the action permission issuing means 33*a* and is transmitted to the customer side through the computer network 17. The trainee on the customer side receives the training by setting the training text 18*d* in the general purpose personal computer 18, and inputs the action permission key 33*b* when he or she receives the training. The action permission checking means 33*c* checks the action permission key 33*b* inputted, for the permission condition such as whether or not the using period is within the contact term, the used machine is proper or the user is entitled. If no problem is found in the check result, the trainee can receive the training. In case the action permission key is illegally altered, moreover, the violation is detected by the violation detection means 42. Then, this violation detection means 42 halts the services for the customer 19 or collects the compensation for the violation.

The training, for which the training text has been sent to the customer side, has a merit that the access speed is higher than that of the training using the computer network, and according to this method, only the entitled person can use the service in security for a specified time period.

Now, the features of the customer support system according to this invention will be summarized covering its additional ones.

According to a first aspect of the customer support system of this invention, there is provided a customer support system for improving the technique of a person engaged in business, comprising: a computer system for introducing training contents from a service providing side to a customer side through a computer network; an instructor training facility for training a person of the customer side as an instructor on the basis of the training contents; and a remote technique training support device for the instructor, for supporting the technical training of the customer side from the service providing side through the computer network.

According to the first aspect of the customer support system of this invention, it is possible to reduce the cost for the technical training support and to enhance the training effect.

According to a second aspect of the customer support system of this invention, there is provided a customer support system for improving the technique of a person engaged in business, comprising: a computer system for introducing training contents from a service providing side to a customer side through a computer network; an instructor training facility for training a person of the customer side as an instructor on the basis of the training contents; and a remote technique training support device for the instructor, for supporting the technical training, as done by the instructor of the customer side, from the service providing side through the computer network.

According to the second aspect of the customer support system of this invention, the use of this system makes it possible to reduce the cost for the technical training support and to enhance the training effect.

In the first or second aspect, according to an additional third aspect of this invention, the customer support system further comprises a computer system for transmitting/receiving an inquiry transmitted from the customer side to the service providing side and a support therefor by an electronic bulletin board or mail through the computer network.

According to the additional third aspect of the customer support system of this invention, it is possible to receive the technical support easily from the service providing side.

In any of the first to third aspects, according to an additional fourth aspect of this invention, the customer support system further comprises a computer system for performing a diagnostic support on the basis of the operation data of a practical machine, transmitted from the customer side to the service providing side through the computer network, to transmit the result to the customer side through the computer network.

According to the additional fourth aspect of the customer support system of this invention, it is possible to receive the diagnostic support accompanying the practical operation of the practical machine.

In the first or second aspect, according to an additional fifth aspect of the customer support system of this invention the instructor training facility for training the instructor is an instructor training facility of the customer side using a training text together.

According to the additional fifth aspect of the customer support system of this invention, it is possible to exploit the training text and to receive the training on the customer side.

In any of the first to fifth aspects, according to an additional sixth aspect of the customer support system of this invention, the instructor training facility is a practical machine training facility.

According to the additional sixth aspect of the customer support system of this invention, as the practical machine training can be done the training is practical and of a high quality.

In the first or second aspect, according to an additional seventh aspect of this invention the customer support system further comprises test result judging means for evaluating a test result using training test question data and the test result.

According to the additional seventh aspect of the customer support system of this invention, it is possible to evaluate the test result.

In any of the first to seventh aspects, according to an additional eighth aspect of this invention, the customer support system further comprising billing means for charging according to the technical support provided.

According to the additional eight aspect of the customer support system of this invention, it is possible to know a proper billing.

In the first or second aspect, according to an additional ninth aspect of this invention, the customer support system further comprising simulation means for calculating a training cost on the basis of the selection of a training item or a training text, and the calculation result is presented to the customer side.

According to the additional ninth aspect of the customer support system of this invention, a desired technical training can be selected by the simulation means.

In the first or second feature, according to an additional tenth aspect of this invention, the customer support system further comprising action permission means for issuing an action permission key, to which a permission condition is attached, from the service providing side to the customer side thereby to permit the technical training support action when the permission condition is satisfied.

According to the additional tenth aspect of this invention, the system can be used when the permission condition is satisfied.

While the presently preferred embodiments of this invention have been shown and described, it is to be understood that these disclosures are for the purpose of illustration and that various changes and modifications may be made without departing from the scope of the invention as set forth in the appended claims.

What is claimed is:

1. A customer support system for improving skill of a person engaged in business, comprising:
    a computer system for introducing training contents from service provider location to a customer location, remote from the service provider location, through a computer network;
    an instructor training facility at the service provider location for training a person from the customer location at the service provider location to become an instructor for the customer location;
    a remote technique training support device for the instructor, after training at the instructor training facility and returning to the customer location, for supporting technical training at the customer location from the service provider location through the computer network; and
    a computer system for performing diagnostic support based on operation data of a practical machine, as transmitted from the customer location to service provider location through the computer network, and for transmitting a result of the diagnostic support to the customer location through the computer network.

2. A customer support system for improving skill of a person engaged in business, comprising:
    a computer system for introducing training contents from service provider location to a customer location, remote from the service provider location, through a computer network;
    an instructor training facility at the service provider location for training a person from the customer location at the service provider location to become an instructor for the customer location;
    a remote technique training support device for the instructor, after training at the instructor training facility and returning to the customer location, for supporting technical training provided by the instructor at the customer location, from the service provider location, side through the computer network; and
    a computer system for performing diagnostic support based on operation data of a practical machine, as transmitted from the customer location to service provider location through the computer network, and for transmitting a result of the diagnostic support to the customer location through the computer network.

3. The customer support system according to claim 2, further comprising a computer system for transmitting and receiving an inquiry transmitted from the customer location to the service provider location and support therefor by an electronic bulletin board or electronic mail through the computer network.

4. The customer support system according to claim 2, wherein said instructor training facility is a practical machine training facility.

5. The customer support system according to claim 2, further comprising test result judging means for evaluating a test result using training test question data and a test result.

6. A customer support system for improving skill of a person engaged in business, comprising:
    a computer system for introducing training contents from a service-providing side to a customer side through a computer network;
    an instructor training facility for training a person of the customer side as an instructor for the customer side, based on the training contents;

a remote technique training support device for the instructor, for supporting technical training, done by the instructor for the customer side, from the service-providing side, through the computer network; and billing means for charging according to technical support provided.

7. A customer support system for improving skill of a person engaged in business, comprising:

a computer system for introducing training contents from a service-providing side to a customer side through a computer network;

an instructor training facility for training a person of the customer side as an instructor for the customer side, based on the training contents;

a remote technique training support device for the instructor, for supporting technical training, done by the instructor for the customer side, from the service-providing side, through the computer network; and simulation means for calculating training cost based on selection of a training item or a training text, wherein the training cost calculated is presented to the customer side.

8. A customer support system for improving skill of a person engaged in business, comprising:

a computer system for introducing training contents from a service-providing side to a customer side through a computer network;

an instructor training facility for training a person of the customer side as an instructor for the customer side, based on the training contents;

a remote technique training support device for the instructor, for supporting technical training, done by the instructor for the customer side, from the service-providing side, through the computer network; and action permission means for issuing an action permission key, to which a permission condition is attached, from the service-providing side to the customer side to permit a technical training support action when the permission condition is satisfied.

* * * * *